United States Patent [19]

Hattori et al.

[11] Patent Number: 4,510,087
[45] Date of Patent: Apr. 9, 1985

[54] PROCESS FOR PRODUCING 1,4-DIAMINOANTHRAQUINONE-2-SULFONIC ACID

[75] Inventors: Makoto Hattori, Osaka; Akihiro Taguma, Hyogo; Akira Takeshita, Osaka, all of Japan

[73] Assignee: Sumitomo Chemical Company, Limited, Osaka, Japan

[21] Appl. No.: 518,177

[22] Filed: Jul. 27, 1983

[30] Foreign Application Priority Data

Aug. 4, 1982 [JP]  Japan .................................. 57-136484

[51] Int. Cl.³ ..................................... C07C 143/665
[52] U.S. Cl. ...................................................... 260/371
[58] Field of Search ......................................... 260/371

[56] References Cited

U.S. PATENT DOCUMENTS 2,842,564  7/1958  Bloom ................................. 260/371

OTHER PUBLICATIONS

Barnett, *Anthracene and Anthraquinone*, 1921, pp. 194–197.

*Primary Examiner*—Glennon H. Hollrah
*Assistant Examiner*—Raymond Covington
*Attorney, Agent, or Firm*—Sughrue, Mion, Zinn, Macpeak, and Seas

[57] ABSTRACT

A process for the production of 1,4-diaminoanthraquinone-2-sulfonic acid or a salt thereof is disclosed, comprising reacting 1-amino-4-bromoanthraquinone-2-sulfonic acid or its salt with liquid ammonia in the presence of a copper catalyst wherein the reaction is carried out in the presence of an inert organic solvent, e.g., n-heptane and cyclohexane. In this process, crystals of the desired product do not substantially deposit on reactor walls, and distillation recovery of ammonia can be performed easily without causing deterioration of the desired product. 1,4-Diaminoanthraquinone-2-sulfonic acid or salt thereof is a useful intermediate for the preparation of, e.g., anthraquinone dyes.

6 Claims, No Drawings

PROCESS FOR PRODUCING 1,4-DIAMINOANTHRAQUINONE-2-SULFONIC ACID

FIELD OF THE INVENTION

The present invention relates to a process for producing 1,4-diaminoanthraquinone-2-sulfonic acid or a salt thereof which is a useful intermediate for the preparation of anthraquinone dyes.

BACKGROUND OF THE INVENTION

It is known that 1,4-diaminoanthraquinone-2-sulfonic acid is obtained by reacting 1-amino-4-bromoanthraquinone-2-sulfonic acid or a salt thereof with liquid ammonia in the presence of a copper catalyst (see German Pat. Nos. 1,142,174 and 1,155,786). In this method, however, the desired product deposits on reactor walls, giving rise to problems such as deterioration of the product due to local overheating, a reduction in heat transfer efficiency particularly at the recovery of ammonia, and deterioration in the handling properties at the post-treatment step. Thus, this method would not be suitable for the production of 1,4-diaminoanthraquinone-2-sulfonic acid or its salt at least on an industrial scale.

In order to overcome the above-described problems, there have been proposed a method in which the reaction is carried out in the presence of formamide or N-methylformamide (see Japanese Patent Application (OPI) No. 123960/81 (the term "OPI" as used herein means a "published unexamined Japanese patent application")), and a method in which ammonia water is used in place of liquid ammonia (see, for example, Japanese Patent Application (OPI) No. 108059/82). These methods, however, suffer from disadvantages in that the yield and purity of the desired product are seriously low as compared with those by the reaction being carried out in liquid ammonia.

SUMMARY OF THE INVENTION

As a result of extensive investigations to overcome the above-described problems, it has been found that the object can be attained by performing the reaction in the presence of inert organic solvents.

An object of the present invention is to provide a process for producing 1,4-diaminoanthraquinone-2-sulfonic acid or a salt thereof by reacting 1-amino-4-bromoanthraquinone-2-sulfonic acid or a salt thereof with liquid ammonia in the presence of a copper catalyst, wherein the reaction is carried out in the presence of an inert organic solvent.

DETAILED DESCRIPTION OF THE INVENTION

Examples of inert organic solvents which can be used in the invention include paraffinic saturated hydrocarbons such as n-pentane, n-hexane, n-heptane, isopentane, isohexane, n-octane, isooctane, decane, dodecane, tetradecane, etc.; naphthenic saturated hydrocarbons such as cyclohexane, methylcyclohexane, cycloheptane, decalin, etc.; and mixtures of these solvents such as naphtha, kerosene, etc. These inert organic solvents are added in such amounts that the starting material or the product can be easily slurried; the amount of the inert organic solvent being used is usually from 1 to 10 times, preferably from 1 to 5 times, the weight of the starting material.

The liquid ammonia as used herein is added in such an amount as to be still enough to dissolve therein the reaction product at the end of the reaction. A molar ratio of liquid ammonia to 1-amino-4-bromoanthraquinone-2-sulfonic acid of its salt is at least 10:1, preferably at least 20:1. The use of an excess amount of liquid ammonia does not inhibit the reaction, but is economically disadvantageous; it is usually sufficient that the molar ratio of liquid ammonia to 1-amino-4-bromoanthraquinone-2-sulfonic acid or its salt is 50:1.

The reaction temperature of the present invention is from 40° to 100° C., preferably from 50° to 90° C.

Examples of copper catalysts which can be used in the invention include metallic copper, cuprous oxide, cupric oxide, copper salts (e.g., copper carbonate, basic copper carbonate, copper acetate, basic copper acetate, copper formate, cuprous chloride, cupric chloride, copper sulfate, cuprous bromide, cupric bromide, etc.), copper complex compounds (e.g., a tetramminecopper sulfate complex salt, etc.), and mixtures thereof, with the cupric oxide being preferred. A suitable amount of the copper catalyst is a catalytic amount, i.e., from 0.1 to 10 g per mole of the starting material.

In the present invention, an alkali as an acid acceptor, e.g., sodium carbonate, sodium hydrogencarbonate, potassium carbonate, sodium acetate, potassium acetate, etc., can be added to the reaction system. The amount of the alkali added is preferably stoichiometrically equivalent to that of hydrogen bromide generated.

The reaction is usually completed within from 1 to 20 hours. In separating the desired product, it is advantageous to use a method in which after the completion of the reaction, the excessive ammonia is recovered in distillation and, thereafter, by adding water to the reaction mixture, the desired product is extracted and separated, whereby a concentrated aqueous solution of a salt of 1,4-diaminoanthraquinone-2-sulfonic acid is obtained. Also, by removing off the inert organic solvent from the reaction mixture by steam distillation, a concentrated aqueous solution or aqueous slurry of a salt of 1,4-diaminoanthraquinone-2-sulfonic acid can be obtained. Such aqueous solution or aqueous slurry can be advantageously sent to a subsequent step as it is, e.g., a step of the production of 1,4-diamino-2,3-dicyanoanthraquinone. When the desired product is isolated, for example, the aqueous solution or slurry can be subjected to acid precipitation or salt precipitation and then filtration to obtain the desired product, 1,4-diaminoanthraquinone-2-sulfonic acid or salt thereof.

In accordance with the process of the invention, crystals of the product do not substantially deposit on reactor walls, and the recovery of ammonia by distillation can be easily performed without causing deterioration of the product. The yield of the desired product is substantially quantitative, and its purity is quite high. Since the reaction mixture after the recovery of ammonia is obtained as a slurry of inert organic solvent of the desired product having good fluidity, it can be easily withdrawn or transported from the reactor and therefore, the subsequent steps can be smoothly carried out. Accordingly, the process of the invention is quite valuable for the use on an industrial scale.

The present invention is explained in greater detail by reference to the following examples. All parts and percents are by weight.

EXAMPLE 1

163.6 parts of sodium 1-amino-4-bromoanthraquinone-2-sulfonate (purity: 94.0%) and 3 parts of cupric oxide were added to 220 parts of n-heptane and stirred at 30° C. to prepare a uniform slurry. This slurry was then placed in an autoclave. The autoclave was closed, and 300 parts of liquid ammonia was introduced thereinto under pressure. The resulting mixture was heated while stirring, and after the temperature had reached 70° C. (inner pressure: 30 kg/cm$^2$), it was maintained at that temperature for 8 hours. Subsequently, the reaction mixture was allowed to stand for cooling to 60° C., and a valve for the recovery of ammonia, as provided to the autoclave, was opened to remove the excessive ammonia. The chromatographic analysis of the reaction mixture showed that the starting material was completely consumed. Then, the reaction mixture was transferred to a separation vessel, and 465 parts of warm water of 70° C. was charged thereinto. After stirring for 1 hour, the resulting mixture was allowed to stand for liquid separation. 87 parts of 50% sulfuric acid was added to an aqueous layer, and precipitated crystals were separated by filtration. The thus-obtained cake was washed with 1% hydrochloric acid and dried to obtain 121.9 parts of an orange-brown powder. The purity of 1,4-diaminoanthraquinone-2-sulfonic acid was 98.3%, and the yield was 99.0%.

The same results were obtained when the foregoing procedure was repeated except that 200 parts of n-hexane, 250 parts of isooctane, 320 parts of decane, or 360 parts of tetradecane was used in place of 220 parts of n-heptane.

EXAMPLE 2

163.6 parts of sodium 1-amino-4-bromoanthraquinone-2-sulfonate (purity: 94.0%) and 2.7 parts of cuprous bromide were added to 250 parts of cyclohexane and stirred at 30° C. to prepare a uniform slurry. This slurry was then placed in an autoclave. The autoclave was closed, and 241 parts of liquid ammonia was introduced thereinto under pressure. The resulting mixture was heated while stirring, and after the temperature had reached 80° C. (inner pressure: 38 kg/cm$^2$), it was maintained at that temperature for 5 hours. Subsequently, the reaction mixture was allowed to stand for cooling to 60° C., and a valve for the recovery of ammonia, as provided to the autoclave, was opened to remove the excessive ammonia. The chromatographic analysis of the reaction mixture showed that the starting material was completely consumed. Then, the reaction mixture was transferred to a distillation vessel where the cyclohexane was removed by steam distillation. Then, 50% sulfuric acid was added thereto, and precipitated crystals were separated by filtration, washed with dilute hydrochloric acid and dried to obtain 122.0 parts of an orange-brown powder. The purity of 1,4-diaminoanthraquinone-2-sulfonic acid was 98.2%, and the yield was 99.0%.

The same results were obtained when the foregoing procedure was repeated except that 300 parts of cycloheptane or 280 parts of decalin was used in place of 250 parts of cyclohexane.

EXAMPLE 3

163.6 parts of sodium 1-amino-4-bromoanthraquinone-2-sulfonate (purity: 94.0%), 2.1 parts of anhydrous copper acetate and 37.3 parts of potassium acetate were added to 360 parts of illuminating kerosene and stirred at 30° C. to prepare a uniform slurry. This slurry was then placed in an autoclave. The autoclave was closed, and 330 parts of liquid ammonia was introduced thereinto under pressure. The resulting mixture was heated while stirring, and after the temperature had reached 60° C. (inner pressure: 25 kg/cm$^2$), it was maintained at that temperature for 16 hours. Subsequently, the ammonia was removed and recovered and then the completion of the reaction was confirmed by chromatographic analysis of the reaction mixture. Thereafter, the same post-treatment as in Example 1 was followed to obtain 121.5 parts of an orange-brown cake. The purity of 1,4-diaminoanthraquinone-2-sulfonic acid was 98.6%, and the yield was 99.0%.

REFERENCE EXAMPLE

The same procedure as in Example 1 was repeated until the ammonia was recovered. Thereafter, the reaction mixture was transferred to a separation vessel, and 500 parts of warm water of 75° C. was charged thereinto. The resulting mixture was stirred for 1 hour and then allowed to stand for liquid separation to obtain 696.3 parts of an aqueous solution containing 119.8 parts of 1,4-diaminoanthraquinone-2-sulfonic acid.

The solution was then cooled to 25° C., and 214 parts of benzyltriethylammonium chloride, 13.9 parts of nitrobenzene and 92.3 parts of sodium cyanide were added thereto. The resulting mixture was heated to 60° to 65° C. while fully stirring, and the reaction was continued until the chromatographic analysis showed that almost all of the starting material was consumed. During the reaction, the pH of the system was adjusted to 9.5 to 9.8 using a 50% sulfuric acid aqueous solution.

The excessive sodium cyanide was then decomposed with aqueous hydrogen peroxide. Then, the mixture was filtered, washed with warm water and dried to obtain 108.5 parts of a dark blue crystalline powder. The purity of 1,4-diamino-2,3-dicyanoanthraquinone was 96%.

While the invention has been described in detail and with reference to specific embodiments thereof, it will be apparent to one skilled in the art that various changes and modifications can be made therein without departing from the spirit and scope thereof.

What is claimed is:

1. A process for producing 1,4-diaminoanthraquinone-2-sulfonic acid or a salt thereof comprising reacting 1-amino-4-bromoanthraquinone-2-sulfonic acid or a salt thereof with liquid ammonia in the presence of a copper catalyst, wherein the reaction is carried out in the presence of an inert organic solvent selected from the group consisting of a paraffinic saturated hydrocarbon, a naphthenic saturated hydrocarbon, and a mixture thereof.

2. A process as claimed in claim 1, wherein the reaction mixture is extracted with water to isolate the desired product, 1,4-diaminoanthraquinone-2-sulfonic acid or salt thereof.

3. A process as claimed in claim 1, wherein said inert organic solvent is selected from the group consisting of n-pentane, n-hexane, n-heptane, isopentane, isohexane, n-octane, isooctane, decane, dodecane, tetradecane, cyclohexane, methylcyclohexane, cycloheptane, decalin, naphtha, and kerosene.

4. A process as claimed in claim 1, wherein said inert organic solvent is used in an amount of from 1 to 10 times the weight of the starting material.

5. A process as claimed in claim 1, wherein the reaction is carried out at a temperature of from 40° C. to 100° C.

6. A process as claimed in claim 1, wherein liquid ammonia is used in an amount of from 10 to 50 times the molar amount of the starting material.

* * * * *